United States Patent Office 3,339,101
Patented Aug. 29, 1967

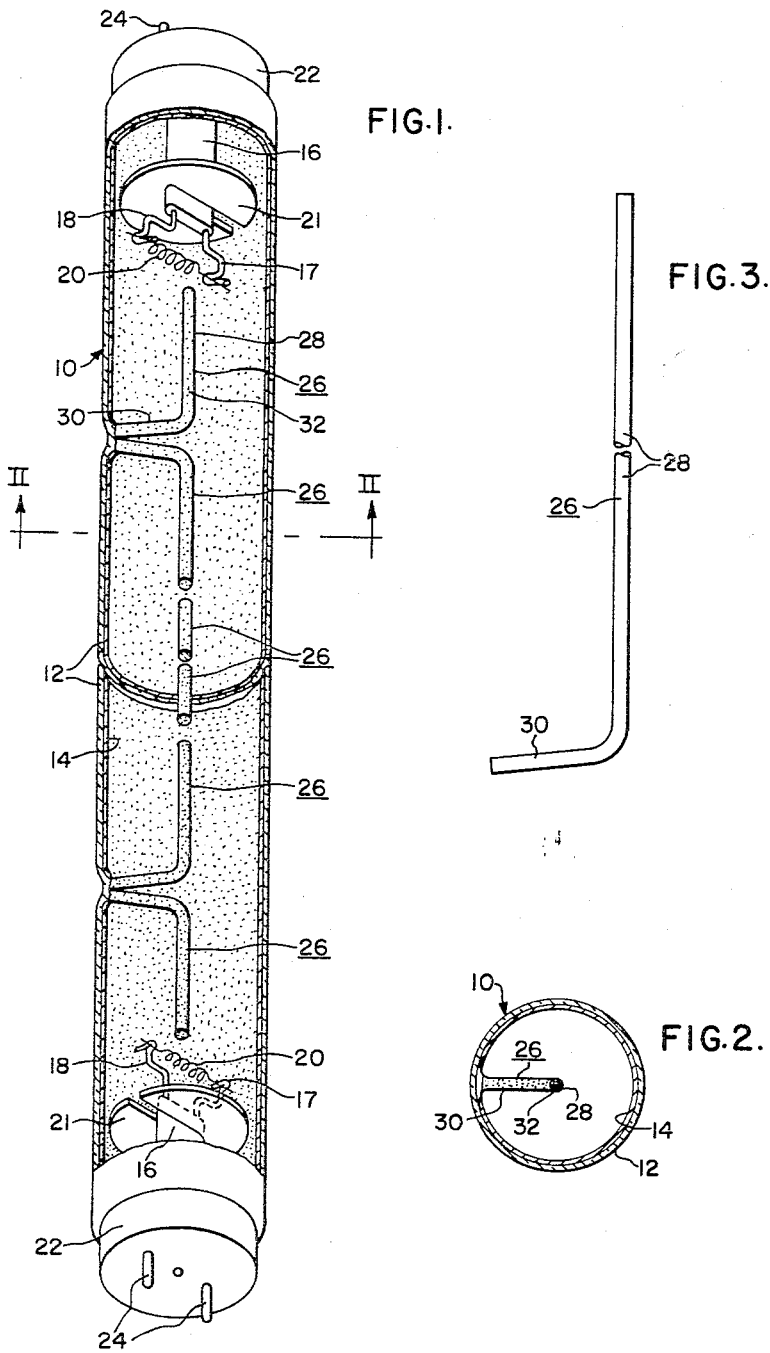

3,339,101
HIGH-OUTPUT FLUORESCENT LAMP WITH IMPROVED PHOSPHOR-COATED GLASS STRUCTURE THAT DEFINES A RECOMBINATION SURFACE AND ENHANCES LUMEN MAINTENANCE
George S. Evans, Caldwell, N.J., assignor to Westinghouse Electric Corporation, East Pittsburgh, Pa., a corporation of Pennsylvania
Filed Nov. 12, 1964, Ser. No. 410,658
4 Claims. (Cl. 313—109)

This invention relates generally to electric discharge lamps and has particular reference to fluorescent lamps designed for operation at power loadings in excess of 20 watts per foot of lamp length.

In order to reduce lighting costs various types of high-output fluorescent lamps have recently been developed. The major obstacle in the design of such lamps is the inherent tendency of the lamp efficiency to decrease as the power input and current density within the gaseous discharge are increased. When the current loading increases the electron temperature decreases resulting in a decrease in the efficiency of generation of 2537A resonance radiation within the discharge.

One approach to this problem is to provide an elongated structure that extends along the discharge space and defines a recombination surface for the electrons and positive ions in the plasma and thus effectively decreases the diffusion length of the discharge. The elongated structure may be a glass rod or the like that is coaxially mounted within the lamp envelope and is so dimensioned that it does not materially decrease the cross-sectional area of the discharge space defined by the envelope or interfere with the free passage of the discharge through the lamp. The reduction in the diffusion length of the discharge increases the electron temperature and thus maintains the efficiency of the lamp at high power loadings within acceptable limits without locally increasing the current loading per unit of cross-sectional area of the discharge. A high-output fluorescent lamp embodying this concept is described in detail and claimed in copending application Ser. No. 112,071 of Daniel A. Larson et al., filed May 23, 1961, assigned to the assignee of the present invention and now U.S. Patent No. 3,290,538. In order to obtain optimum light output it is necessary that the glass rod be coated with phosphor along with the interior surface of the envelope.

While excellent results have been achieved utilizing the principles of the invention disclosed in the aforementioned Larson et al. application, further improvements in the light output and lumen maintenance of the lamp would be desirable.

It is accordingly the general object of the present invention to provide an improved electric discharge lamp.

Another and more specific object is the provision of a highly-loaded fluorescent lamp which utilizes an internally mounted glass rod or the like and exhibits improved lumen maintenance.

The foregoing objects, and other advantages which will become apparent as the description proceeds, are achieved in accordance with the present invention by fabricating the longitudinally extending glass rod (or similar structure) from a special glass that does not adversely affect or react with the overlying coating of phosphor particles at the relatively high temperatures which prevail within the discharge. Specifically, the rod is fabricated from a borosilicate type glass having a composition such that sodium diffusion to the surface of the glass and the resultant depreciation of the phosphor is minimized. Comparative lamp tests have demonstrated that the lumen maintenance of lamps having such phosphor-coated rods is improved by a factor of 5% compared to identical lamps having rods made of the soda lime glass conventionally used for the lamp envelopes.

A better understanding of the invention will be obtained by referring to the accompanying drawing, wherein:

FIGURE 1 is a perspective view of a high-output fluorescent lamp embodying the present invention, portions of the envelope being omitted for convenience of illustration;

FIG. 2 is a cross sectional view of the lamp along the reference line II—II of FIG. 1; and, FIG. 3 is a fragmentary enlarged elevational view of one of the rod members mounted in the lamp shown in FIG. 1.

While the present invention can be used with advantage in various types of discharge devices in which a phosphor-coated longitudinally-extending structure is employed to enhance its performance, the invention is particularly adapted for use in conjunction with fluorescent lamps designed for operation at power loadings in excess of 20 watts per foot of lamp length and has, accordingly, been so illustrated and will be so described.

In FIG. 1 there is shown a highly-loaded fluorescent lamp 10 which consists of a tubular light-transmitting envelope 12 having a coating 14 of suitable ultraviolet-responsive fluorescent phosphor, such as the well known halophosphate type phosphor for example, on its inner surface. A glass stem 16 is sealed into each end of the envelope and a predetermined charge of mercury and a suitable fill gas, such as argon or a mixture or neon and argon at from 1 to 4 mm. pressure, are introduced into the envelope in accordance with standard lamp-making practice. A pair of lead wires 17 and 18 are sealed through each of the stems 16. The inner ends of these lead wires are attached as by clamping to a suitable electrode structure 20 such as a coiled tungsten filament that is coated with emission material. The outer ends of the lead wires 17 and 18 are connected to a pair of pins 24 carried by a base member 22 that is fastened to the respective ends of the envelope. A heat-deflecting disc 21 of aluminum or similar material may be attached to the inner ends of each of the stems 16 to provide a cooling chamber at each end of the envelope that regulates the mercury vapor pressure within the lamp during operation.

The desired recombination surface within the discharge space between the lamp electrodes 20 is provided in the embodiment here illustrated by attaching a plurality of generally L-shaped glass rods 26 of substantially circular cross-section to the inner surface of the envelope at spaced points along its length. As shown more particularly in FIG. 3, each of the rods consist of a relatively long and substantially straight leg 28 and a transversely-extending short leg 30.

As will be noted in FIGS. 1 and 2, the short legs 30 of each of the glass rods 26 are sealed to the inner surface of the envelope 12 and arranged so that the short legs of each pair of rods lie adjacent to one another and the long legs of the respective rods extend in opposite directions in substantial alignment with one another. The transverse legs 30 are of such length that the longitudinally extending legs 28 are substantially aligned with the longitudinal axis of the envelope 12. In addition, the length of the legs 28 are such that their combined length is substantially equal to the length of the discharge path between the electrodes 20. Each of the rods 26 are coated with a layer 32 of phosphor that is also responsive to the ultraviolet radiations produced by the discharge. As a specific example, the rods may be coated with a halophosphate type phosphor. A high-output fluorescent lamp embodying this type of multiple-rod construction is disclosed and claimed in copending application Ser. No. 181,592

(now U.S. Patent No. 3,160,775) of Vernon L. Plagge, filed Mar. 22, 1962, and assigned to the assignee of the present invention.

If desired, a single glass rod may be suspended in coaxial relationship within the envelope 20 by anchoring the ends of the rod to the stems 16, as disclosed in the aforementioned copending application of Larson et al.

The diameter of the rod relative to that of the envelope is rather critical and for maximum output the rod diameter should be less than 0.07 that of the envelope diameter.

In accordance with the present invention the rods 26 are fabricated from a borosilicate glass that contains predetermined quantities of both $Al_2O_3$ and $B_2O_3$. The glass composition and approximate ranges of the various constituents (expressed as oxides) are given in the following table:

TABLE I

| Constituent: | Amount (percent by weight) |
|---|---|
| $SiO_2$ | 65–75 |
| $Na_2O$ | 10–12 |
| $K_2O$ | 4–6 |
| CaO | 3–6 |
| $B_2O_3$ | 2–4 |
| MgO | 2–4 |
| $Al_2O_3$ | 2–3 |

Lamp tests have shown that when the rods are made from the aforementioned borosilicate glass the lumen maintenance is improved by a factor of approximately 5% after 100 hours burning compared to identical lamps having rods made of the ordinary soda-lime glass of the type conventionally used in the envelope and which contains no $B_2O_3$ and has a lower $Al_2O_3$ content. While the reason for this marked improvement in lumen maintenance is not known at the present time, it is believed that the boron and alumina in the glass chemically immobilize the sodium ions and prevent them from diffusing to the surface of the glass rod and reacting with the phosphor coating. This is verified by test data on conventional lamps having soda-lime envelopes wherein the lumen maintenance of identical lamps operated under the same conditions, but at various temperatures, were compared after various periods of burning. The results of these tests are given below in Table II:

TABLE II

| Operating Temperature | Percent of Light Output | | | | |
|---|---|---|---|---|---|
| | 0 hrs. | 100 hrs. | 600 hrs. | 1,500 hrs. | 3,000 hrs. |
| Bulb wall temp., 70° C | 100 | 97 | 92 | 84 | 75 |
| Bulb wall temp., 100° C | 100 | 97 | 91 | 80 | 67 |
| Bulb wall temp., 130° C | 100 | 94 | 85 | 73 | 61 |

From the data given in Table II it will be seen that the light output of a conventional fluorescent lamp having a phosphor coating in contact with a bulb made of soda-lime glass decreases at a much faster rate as the operating temperature of the bulb is increased. Tests on axial-rod lamps show that the surface of a glass rod located on the axis of a lamp having an envelope 2⅛ inches in diameter and operated at 50 watts per foot operates at a temperature in excess of 150° C. Since this temperature is considerably higher than the bulb wall temperatures given in Table II, it is obvious that the drop in light output exhibited by a phosphor coating on a rod made of soda-lime glass would be much greater than that indicated in the table. Hence, the fact that the rod is located at the center of the discharge and inherently operates at a much higher temperature than the bulb wall accentuates the lumen maintenance problem and increases the advantages gained by using borosilicate glass rods.

From the foregoing it will be apparent that the objects of the invention have been achieved insofar as a highly-loaded fluorescent lamp having an axially-mounted glass rod has been provided which not only can be operated at higher power inputs but maintains its output for a longer period of time than the prior art high-output type lamps. The physical properties of the aforesaid borosilicate glass are such that it can be sealed directly to a soda-lime glass envelope without any difficulty and will withstand the higher temperatures at which the rod operates.

While one embodiment of the invention has been illustrated and described in detail, it will be appreciated that various changes in both the construction of the lamp and the glass composition may be made without departing from the spirit and scope of the invention. The rod, for example, can be of non-linear configuration or replaced by a rib-like structure as set forth in the aforesaid copending Larson et al. application.

I claim as my invention:

1. In a high-output fluorescent lamp, the combination comprising:
    a sealed light-transmitting envelope containing an ionizable medium,
    a pair of electrodes within said envelope between which a gaseous discharge occurs when the lamp is energized,
    means defining a recombination surface for electrons and ions within said lamp comprising an elongated member that extends along the discharge space between said electrodes and is composed of a glass that contains, on a percent by weight basis, from about 65% to 75% $SiO_2$, about 10% to 12% $Na_2O$, about 4% to 6% $K_2O$, about 3% to 6% CaO, about 2% to 4% $B_2O_3$, about 2% to 4% MgO, and about 2% to 3% $Al_2O_3$, and
    a coating on said elongated glass member of a phosphor that is responsive to ultraviolet radiation,
    said elongated glass member, by virtue of its composition and properties at the temperatures which prevail within the discharge space, permitting the use in said coating of a phosphor that is adversely affected by sodium or sodium ions.

2. The fluorescent lamp set forth in claim 1 wherein said elongated glass member is so oriented that at least a portion thereof is located at the center of the discharge.

3. The fluorescent lamp set forth in claim 2 wherein said envelope is fabricated from soda-lime glass.

4. The fluorescent lamp set forth in claim 3 wherein said elongated glass member comprises a rod that extends along the discharge space and is substantially straight and disposed in substantially coaxial alignment with said envelope, said phosphor comprises a halophosphate phosphor, and said lamp is adapted to be operated at power loadings in excess of 20 watts per foot.

References Cited

UNITED STATES PATENTS

| 3,012,168 | 12/1961 | Ray et al. | 313—221 |
| 3,054,686 | 9/1962 | Hagedorn | 106—54 |
| 3,160,775 | 12/1964 | Plagge | 313—109 |
| 3,252,812 | 5/1966 | De Lajarte | 106—54 |

JAMES W. LAWRENCE, *Primary Examiner.*

R. JUDD, *Assistant Examiner.*